Figure 1:
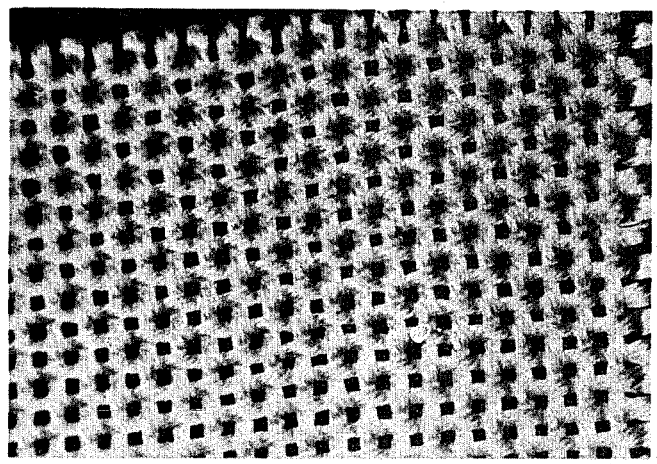

United States Patent [19]
Watanabe et al.

[11] 4,337,141
[45] Jun. 29, 1982

[54] CATION EXCHANGE MEMBRANE

[75] Inventors: Itaru Watanabe; Isamu Wataya; Sakae Tsushima, all of Yokohama, Japan

[73] Assignee: Asahi Kasei Kogyo Kabushiki Kaisha, Osaka, Japan

[21] Appl. No.: 175,375

[22] Filed: Aug. 5, 1980

[30] Foreign Application Priority Data

Aug. 10, 1979 [JP] Japan .................. 54-101180

[51] Int. Cl.$^3$ ............................. B01D 13/02
[52] U.S. Cl. ................ 204/301; 204/180 P; 204/296
[58] Field of Search .......... 204/180 P, 301, 296; 161/153; 521/27

[56] References Cited

U.S. PATENT DOCUMENTS

| 3,120,463 | 2/1964 | Russell | 161/153 |
| 3,356,607 | 12/1967 | Eisenmann et al. | 204/296 X |
| 3,607,706 | 9/1971 | Eisenmann et al. | 204/180 P X |
| 3,616,319 | 10/1971 | Johnson et al. | 204/296 X |

FOREIGN PATENT DOCUMENTS

47-12323 4/1972 Japan.
54-1687 1/1979 Japan.

*Primary Examiner*—Arthur C. Prescott
*Attorney, Agent, or Firm*—Birch, Stewart, Kolasch & Birch

[57] ABSTRACT

A cation exchange membrane reinforced by one sheet of a woven fabric made of folded glass-fiber-filament yarns subjected to a bulky treatment is found to be improved in dimensional stability, water permeability (water leakage) and durability with much improved adhesion of the reinforcement to the resin constituting the cation exchange membrane.

5 Claims, 2 Drawing Figures

CATION EXCHANGE MEMBRANE

The present invention relates to an improved cation exchange membrane. More particularly, the invention relates to a cation exchange membrane reinforced by a woven fabric made of folded yarns of glass fiber filaments, which yarns have been subjected to a bulky treatment.

Various ion exchange membranes have heretofore been developed and used in various fields. Large numbers of various ion exchange membranes are used especially in the field of electrodialysis which is utilized for the production of sodium chloride by the concentration of sea water, for the preparation of fresh water by the desalination of sea water or underground salt water and for the desalination of cheese whey. Furthermore, for the dimerization of acrylonitrile by electrolytic reduction (the production of adiponitrile) and the production of sodium hydroxide by the electrolysis of sodium chloride, ion exchange membranes adapted to respective conditions during use thereof have been developed and used. In the field of electrodialysis, since conditions under which ion exchange membranes are used, such as a temperature, current density and the composition of a solution, are generally moderate, reinforced ion exchange membranes having sufficient performance and durability for use in electrodialysis can be easily obtained even by using as the reinforcing material an ordinary synthetic fiber such as a polypropylene fiber, a polyvinyl chloride fiber or an acrylonitrile-vinyl chloride copolymer fiber.

However, in the electrolysis of either of sodium chloride and acrylonitrile, the temperature at which ion exchange membranes are used is high and the current density employed is about 10 times as high as the current density employed in electrodialysis. In the electrolysis of sodium chloride, since a high resistance to chlorine formed by the electrolysis is required of ion exchange membranes, perfluorocarbon type cation exchange membranes reinforced by a woven fabric of expensive perfluorocarbon type fiber have been used. In the electrolysis of acrylonitrile, ion exchange membranes are not required to have a high resistance to oxidation since they are used in a reducing atmosphere. However, in this case, the ion exchange membranes are apt to be readily swollen and damaged because of their contact with organic substances (such as acrylonitrile and adiponitrile) present in amounts of several percent or more in an electrolytic solution. Furthermore, since the pressure difference between both the sides of an ion exchange membrane is as large as 0.2 to 0.5 Kg/cm$^2$ in the electrolysis of acrylonitrile, a high mechanical strength is required of the ion exchange membrane. In these respects, the manufacture of cation exchange membranes having a good dimensional stability during use thereof, a reduced water permeability (water leakage) and an excellent durability has been very difficult. Therefore, various reinforcing materials have been proposed for manufacturing such cation exchange membranes.

From the viewpoints of the dimensional stability, heat resistance and mechanical strength, woven fabrics of glass fiber have been used as reinforcing materials for ion exchange membranes. However, cation exchange membranes reinforced by an ordinary woven fabric of glass fiber are unsatisfactory in water permeability and durability. As a means for eliminating such defects, there have been proposed methods in which a cation exchange membrane is reinforced by a laminate made of at least two sheets of a woven fabric of glass fiber (Japanese Pat. Publications Nos. 12,323/1972 and 1,687/1979). However, in the case of cation exchange membranes reinforced by a laminate made of at least two sheets of a woven fabric of glass fiber, some troubles are inevitably encountered, owing to the use of the laminate, in the manufacture of the reinforced cation exchange membrane and in use thereof for electrolysis. Accordingly, it cannot be said that such proposals provide remarkable improvements in manufacture and characteristics of cation exchange membranes. More specifically, peeling is liable to readily occur between sheets of a woven fabric constituting a reinforcing laminate during the manufacture of a cation exchange membrane. For obviating this trouble, a non-polar solvent used in the preparation of a polymer, constituting together with the reinforcing laminate a membrane structure, must be substituted with a polar solvent prior to subjecting the membrane structure to a sulfonation treatment (Japanese Patent Publication No. 12,323/1972). This is so because the non-polar solvent has a large tendency to swell the polymer if the polymer is not yet sulfonated but a tendency to swell the polymer once the polymer has been sulfonated than the polar solvent. The solvent substitution may minimize the internal stress of the membrane structure, which stress is caused by the changing polymer-swelling tendency of the solvent in the course of the sulfonation of the polymer. Since the polar solvent is a compound which is liable to readily react with a sulfonating agent, wasteful consumption of the sulfonating agent may be unavoidable. Further, an additional step of solvent substitution which may be unnecessary in the case of the use of one sheet of a reinforcing woven fabric is needed because of the use of the reinforcing laminate. Furthermore, the laminate-reinforced cation exchange membrane produced through these complicated steps is essentially defective in that when it is used for electrolysis, which is conducted at a high temperature and at a high current density, blistering and/or cracking of the cation exchange membrane occurs in a short period of time after the start of the electrolysis. In the case of a cation exchange membrane comprising a reinforcement of a woven fabric of spun yarns of glass staple fiber (Japanese Patent Publication No. 1,687/1979), environmental contamination with fine glass fiber is caused throughout the steps involved in the manufacture of glass fiber, the weaving of glass fiber and the preparation of the cation exchange membrane. Such environmental contamination may be avoided if special equipment for preventing the same is installed, but this will inevitably result in an increase in the manufacturing cost of reinforced cation exchange membranes.

It is an object of the present invention to provide an improved glass fiber-reinforced cation exchange membrane in which the defects of the conventional cation exchange membranes reinforced by a woven fabric of glass fiber are eliminated. Another object of the present invention is to provide a cation exchange membrane as described above, in which properties required of membranes to be used for electrolysis, such as dimensional stability, water permeability (water leakage) and durability are greatly improved with much improved adhesion of the reinforcement to the resin constituting the cation exchange membrane.

Figure 2:
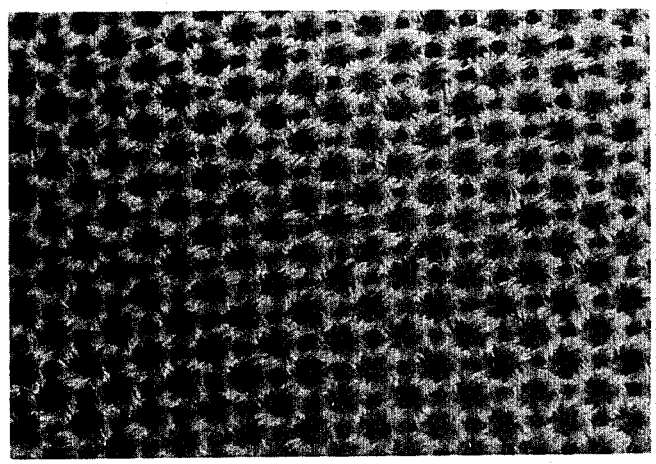

The foregoing and other objects, features and advantages of the present invention will be apparent to those skilled in the art from the following detailed description taken in connection with the accompanying drawing in which:

FIG. 1 is a photograph (plan view) of a woven fabric made of folded yarns of glass fiber filaments which yarns are not subjected to any bulky treatment; and FIG. 2 is a photograph (plan view) of a woven fabric made of folded yarns of glass fiber filaments which yarns are subjected to a bulky treatment.

In accordance with the present invention, there is provided a cation exchange membrane which is reinforced by one sheet of a woven fabric made of folded yarns of glass fiber filaments which yarns have been subjected to a bulky treatment.

Ordinary methods well known in the art may be employed for effecting the bulky treatment of either bundles of filaments (single yarns) before subjected to a folding operation or folded yarns to be used, after woven into a woven fabric, in the cation exchange membrane of the present invention. For example, the so-called Air-jet method is preferably adopted. The change in appearance of woven fabric due to the bulky treatment will be apparent when a comparison is made between FIG. 1 showing a woven fabric made of folded yarns of glass fiber filaments not subjected to any bulky treatment and FIG. 2 showing a woven fabric made of folded yarns of glass fiber filaments.

The bulky treatment is effective for improving the adhesion of the reinforcement (woven fabric of folded yarns of glass fiber filaments) to the resin constituting the cation exchange membrane and, hence, retaining excellent initial characteristics such as low water permeability of the cation exchange membrane for a long time in use for electrolysis.

The processing conditions of the bulky treatment differ from method to method, and may be controlled with reference being made to the infrared absorption intensity and electric resistance in an aqueous sodium chloride solution of the resulting woven fabric. In the present invention, it is preferred that the ratio of the infrared absorption intensity (I) at 1,000 cm$^{-1}$ of a woven fabric made of folded yarns subjected to the bulky treatment relative to the infrared absorption intensity ($I_o$) at 1,000 cm$^{-1}$ of the corresponding woven fabric made of folded yarns not subjected to the bulky treament be in the range defined by the formula: $1.1 \leq I/I_o \leq 5.0$, and that the ratio of the specific conductivity ($H \times 10^{-3} \Omega^{-1} cm^{-1}$) at a frequency of 1,000 c/s of a woven fabric made of folded yarns subjected to the bulky treatment in a 0.5 N aqueous solution of sodium chloride at 25° C. relative to the specific conductivity ($H_o \times 10^{-3} \Omega^{-1} cm^{-1}$) at a frequency of 1,000 c/s of the corresponding woven fabric made of folded yarns not subjected to the bulky treatment in a 0.5 N aqueous solution of sodium chloride at 25° C. be in the range defined by the formula: $1.05 \leq H/H_0 \leq 1.30$.

When the ratio of $I/I_o$ is lower than 1.1 and/or the ratio of $H/H_o$ is lower than 1.05, the adhesion of the reinforcement to the resin constituting the cation exchange membrane tends to be so insufficient that the water permeability of the membrane may be large and the durability of the membrane in electrolysis may be insufficient. On the other hand, when the ratio of $I/I_o$ is higher than 5.0 and/or the ratio of $H/H_o$ is higher than 1.30, the resulting cation exchange membrane is satisfactory in water permeability and durability, but is liable to unfavorably increase power consumption in electrolysis because of its low specific conductivity.

The water permeability, durability, specific conductivity and dimensional stability of a cation exchange membrane are important characteristics having significant influences on the performance of the ion exchange membrane. However, the specific conductivity is essentially contradictory to the other characteristics and, hence, the main difficulty is encountered in acquiring a good balance between these characteristics. In the case of the cation exchange membrane of the present invention, a particularly excellent balance between these characteristics is acquired when the ratio of $I/I_o$ is in the range of from 2.0 to 3.0 and the ratio of $H/H_o$ is in the range of from 1.10 to 1.25.

In the folded yarns that are used in the woven fabric as the reinforcement of the cation exchange membrane of the present invention, it is preferred that the number of single yarns or intermediate folded yarns finally folded be at least 3. Here, the term "single yarn" is intended to mean a bundle of filaments which may or may not be subjected to primary twisting, and the term "intermediate folded yarn" is intended to mean a folded yarn to be subjected to further folding. Of course, folded yarns in which the number of single yarns or intermediate folded yarns finally folded is 2 may be used. However, in this case, when a woven fabric made of these folded yarns is used as the reinforcement, delicate and subtle unevenness in thickness may unfavorably appear in the resulting cation exchange membrane since the cross-sections of the folded yarns are substantially flat. If the number of single yarns or intermediate folded yarns finally folded is 3 or more, the final folded yarns have a more circular cross-section which will provide a more uniform thickness of the resulting cation exchange membrane.

The diameter of each glass fiber filament constituting the single yarn is not particularly critical in the present invention, but is preferably in the range of from 7 to 13$\mu$. If the diameter of each of the filaments is smaller than 7$\mu$, they are apt to be readily broken during the bulky treatment and/or the preceding or subsequent folding step and/or the subsequent weaving step. On the other hand, if the diameter of each of the filaments exceeds 13$\mu$, the effective bulky treatment tends to become so difficult that strict conditions may be adopted for the bulky treatment.

150 to 250 filaments are usually gathered or bundled and the resulting bundle of filaments is subjected to the folding operation. Either the bundles of filaments (single yarns) or the intermediate or final folded yarns formed from an appropriate number of the bundles of filaments (single yarns) may be subjected to the bulky treatment which may be carried out either once or twice or three times or more.

The folded yarns constituting the woven fabric to be used as the reinforcement of the cation exchange membrane of the present invention are each preferably of 1,000 to 2,000 Tex. It is preferred that after primary twisting of the bundles of filaments, they be subjected twice or three times to the folding operation.

The woven fabric that is used as the reinforcement of the cation exchange membrane of the present invention is formed from folded yarns of glass fiber filaments, which have been subjected to the bulky treatment, according to any of customary weaving methods. The fabric may be in a plain weave, twill weave, satin weave or leno weave construction. A plain weave fabric is usually preferable and suitable in the present invention. Each of the warp density and weft density of the fabric may be 5 to 15 yarns, preferably 7 to 10 yarns, per inch. If the warp or weft density is lower than 5 yarns per inch, the void volume of the fabric is increased and a cation exchange membrane comprising the fabric as the reinforcement has a reduced electric resistance but tends to have a degraded durability. If the warp or weft density is higher than 15 yarns per inch, a cation exchange membrane comprising the fabric as the reinforcement tends to unfavorably have too high an electric resistance.

The thickness of the woven fabric is usually in the range of from 0.7 to 2.5 mm, preferably from 0.9 to 2.0 mm. In order to improve the adhesion of the woven fabric made of folded yarns of glass fiber filaments to the resin constituting the cation exchange membrane of the present invention, it is preferred that the woven fabric be subjected to a customary treatment with a silane coupling agent or the like.

Any resin known in the art can be used in the cation exchange membrane of the present invention. The most representative resin that may be used in the cation exchange membrane of the present invention is a sulfonated product of a styrene-divinylbenzene copolymer, the preparation of which may usually be carried out by immersing a reinforcing woven fabric in a mixture of styrene, divinylbenzene (the commercially available divinylbenzene usually has a purity of about 55% by weight and contains ethylvinylbenzene as most of the balance), an appropriate non-polymerizable additive and a polymerization catalyst, effecting the catalytic polymerization, removing part or all of the non-polymerizable additive from the resulting copolymer and treating the copolymer with a sulfonating agent. The removal of the non-polymerizable additive and the sulfonation treatment of the copolymer may be conducted either separately in sequence or simultaneously as in Examples which will be given later and wherein dichloroethane contained in the solution of sulfuric anhydride-dioxane adduct serves to remove dioctyl phthalate from the copolymer. As the nonpolymerizable additive which will make the resulting membrane structure microporous, there can be mentioned, for example, dioctyl phthalate, dibutyl phthalate and dibutyl sebacate. As the sulfonating agent, there can be mentioned, for example, concentrated sulfuric acid and sulfuric anhydride-dioxane adduct. In preparing a cation exchange membrane according to the present invention, it is preferred that the weight ratio of styrene/divinylbenzene (purity: about 55% by weight)/non-polymerizable additive/polymerization catalyst be (60-80)/(20-40)/(80-120)/(0.1-0.5). Usually, dozens of sheets of a release film made of, for example, polyethylene terephthalate are each employed between each adjacent pair of dozens of sheets of the reinforcing woven fabric immersed in the above-mentioned mixture containing the monomers, so that dozens of membrane structures from which cation exchange membranes are to be prepared can be easily produced by removing said dozens of sheets of the release film after copolymerization of the monomers. Alternatively, such a membrane structure may be produced according to a drum casting method, a plate casting method or a paste casting method (Japanese patent Publication No. 34,476/1974 and U.S. Pat. No. 3,510,418).

The present invention will now be described in detail with reference to the following Examples that by no means limit the scope of the invention.

In the Examples and Comparative Examples, the water permeability and specific conductivity of a cation exchange membrane were determined according to the following methods.

Water Permeability

A hydraulic pressure of 0.5 Kg/cm$^2$ was applied to one surface of a cation exchange membrane, and the amount of water leaking from the other surface of the membrane per unit time and unit area (ml/m$^2$.hr) was measured.

Specific Conductivity

In a 0.5 N aqueous solution of sodium chloride maintained at 25° C., a cation exchange membrane was interposed between two electrodes in contact relationship. An alternating current of 1,000 cycles/sec in frequency was caused to flow between the electrodes, and the electric resistance was measured. The specific conductivity was expressed by the value $(10^{-3}\Omega^{-1}cm^{-1})$ obtained by dividing the measured electric resistance by the thickness of the cation exchange membrane.

EXAMPLE 1

Two hundred filaments of alkali-containing glass fiber having a diameter of 9μ were bundled to form a bundle of filaments, which was then subjected to primary twisting, followed by folding at folding numbers in sequence (numbers of single yarns or intermediate folded yarns subjected to folding in sequence) of 1/4/2/5 in this order. The resulting folded yarns were subjected to a bulking treatment by treatment with air jets according to the Air-jet method. From the folded yarns subjected to the bulking treatment, a plain weave fabric was prepared at a fabric density of 4 warp yarns per inch of length and 8 weft yarns per inch of width. The woven fabric was treated with a vinylsilane coupling agent. The infrared absorption intensity ratio of $I/I_o$ and the specific conductivity ratio of $H/H_o$ were found to be 2.4 and 1.19, respectively, when the vinylsilane-treated woven fabric subjected to the bulky treatment and the corresponding woven fabric not subjected to the bulky treatment were examined.

The vinylsilane-treated woven fabric subjected to the bulky treatment was immersed in a mixed solution of styrene, divinylbenzene (purity: about 55% by weight), dioctyl phthalate and benzoyl peroxide (at a mixing weight ratio of 75:25:90:0.2), and the polymerization was carried out by gradually heating the solution from room temperature to about 100° C. The resulting membrane having the fabric embedded therein was subjected to a sulfonating treatment in a 5 weight percent dichloroethane solution of sulfuric anhydride-dioxane adduct to obtain a cation exchange membrane having a thickness of 1.65 mm. The cation exchange membrane was washed with an aqueous solution of sodium chloride and then with water. The water permeability of the cation exchange membrane was measured and found to be 10 ml/m$^2$.hr. The cation exchange membrane was used in electrolysis for the dimerization of acrylonitrile at a current density of 20 A/dm$^2$ at 50° C. for 3,500 hours, and the water permeability of the used membrane was measured. It was found that the water permeability of the used membrane was 15 ml/m$^2$.hr and showed only a moderate increase over that of the membrane prior to use for the electrolysis.

COMPARATIVE EXAMPLE 1

A cation exchange membrane was prepared in substantially the same manner as in Example 1 except that the bulky treatment was omitted. The water permeability of the cation exchange membrane was 100 ml/m$^2$.hr, and increased to 1,000 ml/m$^2$.hr when the membrane was used for electrolysis as in Example 1 only for 500 hours.

EXAMPLE 2

A cation exchange membrane was prepared in substantially the same manner as in Example 1 except that the bulky treatment was carried out after the stage where four single yarns formed by the primary twisting of bundles of filaments were folded.

When the vinylsilane-treated woven fabric subjected to the bulky treatment and used as the reinforcement of the cation exchange membrane and the corresponding woven fabric not subjected to the bulky treatment were examined, it was found that the infrared absorption intensity ratio of I/I$_o$ was 2.3 and that the specific conductivity ratio of H/H$_o$ was 1.21. The water permeability of the cation exchange membrane was 15 ml/m$^2$.hr. After 2,500 hours' electrolysis as in Example 1, the water permeability of the used membrane was 20 ml/m$^2$.hr.

EXAMPLE 3

Two hundred filaments of glass fiber having a diameter of 13$\mu$ were bundled to form a bundle of filaments, which was then subjected to a bulky treatment according to the Air-jet method. Then, 7 bundles of filaments subjected to the bulky treatment were folded to form an intermediate folded yarns, and 3 intermediate folded yarns were further folded. A plain weave fabric was prepared from the resulting folded yarns at a fabric density of 9 warp yarns per inch of length and 8 weft yarns per inch of width, and the woven fabric was treated with a vinylsilane coupling agent. The infrared absorption intensity ratio of I/I$_o$ was 2.8, and the specific conductivity ratio of H/H$_o$ was 1.16.

The vinylsilane-treated woven fabric was immersed in a mixed solution of styrene, divinylbenzene (purity: about 55% by weight), dibutyl phthalate and benzoyl peroxide (at a mixing weight ratio of 80:20:120:0.2), and the polymerization was carried out under heating between room temperature and about 100° C. The resulting membrane having the fabric embedded therein was subjected to a sulfonation treatment as in Example 1 to form a cation exchange membrane having a thickness of 1.3 mm. The water permeability of the membrane was 20 ml/m$^2$.hr, and increased only to 35 ml/m$^2$.hr after use in 2,500 hours' electrolysis as in Example 1.

EXAMPLE 4

Two hundred filaments of glass fiber having a diameter of 7$\mu$ were bundled to form a bundle of filaments, which was then subjected to folding at folding numbers in sequence of 1/4/3/4 in this order, followed by a bulky treatment according to the Air-jet method. A plain weave fabric was prepared from the resulting folded yarns at a fabric density of 10 warp yarns per inch of length and 10 weft yarns per inch of width. The woven fabric was treated with a vinylsilane coupling agent. The infrared absorption intensity ratio of I/I$_o$ was 1.2, and the specific conductivity ratio of H/H$_o$ was 1.25.

The vinylsilane-treated woven fabric was immersed in a mixed solution of styrene, divinylbenzene (purity: about 55% by weight) dioctyl phthalate and azobisisobutyronitrile (at a mixing weight ratio of 70:30:80:0.1), and the polymerization was carried out under heating between room temperature and about 100° C. The resulting membrane was subjected to a sulfonation treatment as in Example 1 to form a cation exchange membrane having a thickness of 1.5 mm.

The water permeability of the cation exchange membrane was 15 ml/m$^2$.hr. Even after 3,000 hours' electrolysis as in Example 1, the water permeability of the membrane was not substantially changed.

EXAMPLE 5

A cation exchange membrane was prepared in substantially the same manner as in Example 1 except that the bulky treatment was carried out twice after the stage where four single yarns formed by the primary twisting of bundles of filaments were folded and after the stage where five intermediate folded yarns were finally folded. When the vinylsilane-treated woven fabric subjected to the bulky treatment and used as the reinforcement of the cation exchange membrane and the corresponding woven fabric not subjected to the bulky treatment were examined, it was found that the infrared absorption intensity ratio of I/I$_o$ was 5.0 and the specific conductivity ratio of H/H$_0$ was 1.05. The water permeability of the cation exchange membrane was 5 ml/m$^2$.hr and increased only to 7 ml/m$^2$.hr after use in 5,000 hours' electrolysis as in Example 1.

What is claimed is:

1. A reinforced cation exchange membrane comprising a cation exchange membrane formed of a resin material and a sheet of a woven fabric made of folded yarns of glass fiber filaments, said yarns having been subjected to a bulking treatment with air jets.

2. A cation exchange membrane as claimed in claim 1, wherein said bulking treatment is such that the ratio of the infrared absorption intensity (I) at 1,000 cm$^{-1}$ of said woven fabric made of the folded yarns subjected to the bulking treatment relative to the infrared absorption intensity (I$_o$) at 1,000 cm$^{-1}$ of the corresponding woven fabric made of folded yarns not subjected to the bulking treatment is in the range defined by the formula: $1.1 \leq I/I_o \leq 5.0$, and such that the ratio of the specific conductivity (H$\times 10^{-3} \Omega^{-1}$cm$^{-1}$) at a frequency of 1,000 c/s of said woven fabric made of the folded yarns subjected to the bulking treatment in a 0.5 N aqueous solution of sodium chloride at 25° C. relative to the specific conductivity (H$_o \times 10^{-3} \Omega^{-1}$cm$^{-1}$) at a frequency of 1,000 c/s of the corresponding woven fabric made of folded yarns not subjected to the bulking treatment in a 0.5 N aqueous solution of sodium chloride at 25° C. is in the range defined by the formula: $1.05 \leq H/H_o \leq 1.30$.

3. A cation exchange membrane as claimed in claim 1 or 2, wherein said folded yarns are each formed from at least three single yarns or from intermediate folded yarns to be subjected to final folding.

4. A cation exchange membrane as claimed in claim 1 or 2, wherein said membrane is prepared by subjecting bundles of said filaments or said yarns to a bulking treatment by treatment with air jets to produce bulked yarns, treating said bulked yarns with a vinylsilane coupling agent, immersing said bulked yarns in a monomeric solution containing styrene and divinylbenzene, polymerizing said monomers and sulfonating the obtained membrane to produce a cation exchange membrane.

5. A cation exchange membrane as claimed in claim 1 or 2, wherein said resin is a sulfonated product of a styrene-divinylbenzene copolymer.

* * * * *